United States Patent
Imada et al.

(10) Patent No.: US 10,331,474 B2
(45) Date of Patent: Jun. 25, 2019

(54) MACHINE SYSTEM, PHYSICAL MACHINE, AND MEMORY CONTROL METHOD

(71) Applicant: Hitachi, Ltd., Tokyo (JP)

(72) Inventors: Takayuki Imada, Tokyo (JP); Toshiomi Moriki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/769,347

(22) PCT Filed: Jan. 8, 2016

(86) PCT No.: PCT/JP2016/050548
§ 371 (c)(1),
(2) Date: Apr. 19, 2018

(87) PCT Pub. No.: WO2017/119128
PCT Pub. Date: Jul. 13, 2017

(65) Prior Publication Data
US 2018/0307518 A1  Oct. 25, 2018

(51) Int. Cl.
*G06F 3/06* (2006.01)
*G06F 9/455* (2018.01)
*G06F 12/10* (2016.01)
*G06F 9/46* (2006.01)
(Continued)

(52) U.S. Cl.
CPC .......... *G06F 9/45558* (2013.01); *G06F 3/061* (2013.01); *G06F 3/0608* (2013.01); *G06F 3/0631* (2013.01); *G06F 3/0652* (2013.01); *G06F 3/0683* (2013.01); *G06F 9/46* (2013.01); *G06F 9/50* (2013.01); *G06F 12/10* (2013.01); *G06F 21/78* (2013.01);
(Continued)

(58) Field of Classification Search
CPC ...... G06F 3/0631; G06F 3/0608; G06F 3/061; G06F 3/0652; G06F 3/0683; G06F 9/45558; G06F 9/50; G06F 9/46; G06F 12/10; G06F 21/78; G06F 2009/45562; G06F 2009/45579; G06F 2009/45583
USPC ........................................................ 711/154
See application file for complete search history.

(56) References Cited

U.S. PATENT DOCUMENTS

| | | | |
|---|---|---|---|
| 9,727,368 B1 * | 8/2017 | Tsirkin ................ | G06F 9/45558 |
| 9,996,370 B1 * | 6/2018 | Khafizov ............ | G06F 9/45533 |
| 10,108,446 B1 * | 10/2018 | Steinberg ............ | G06F 9/45558 |

(Continued)

OTHER PUBLICATIONS

Implementing and Configuring Dynamic Memory; Microsoft Windows Server (registered trademark) 2008R2, Microsoft, Oct. 2010.
(Continued)

*Primary Examiner* — Hiep T Nguyen
(74) *Attorney, Agent, or Firm* — Mattingly & Malur, PC

(57) ABSTRACT

A machine system includes a physical machine, a memory pool, and a memory pool management machine. The memory pool management machine manages, with respect to a memory region of the memory pool, an allocated region, a cleared region, and an uncleared region. When generating a virtual machine, a hypervisor in the physical machine sends a memory allocation request to the memory pool management machine. When a response, to the request, received from the memory pool management machine includes an address range belonging to the uncleared region, the hypervisor clears the memory region of the address range belonging to the uncleared region and then generates the virtual machine.

7 Claims, 4 Drawing Sheets

(51) Int. Cl.
*G06F 9/50* (2006.01)
*G06F 21/78* (2013.01)

(52) U.S. Cl.
CPC .............. *G06F 2009/45562* (2013.01); *G06F 2009/45579* (2013.01); *G06F 2009/45583* (2013.01)

(56) References Cited

U.S. PATENT DOCUMENTS

| | | | |
|---|---|---|---|
| 2004/0060048 A1* | 3/2004 | Abelite | G06F 11/1438 718/1 |
| 2012/0159071 A1 | 6/2012 | Kamon et al. | |
| 2012/0239850 A1* | 9/2012 | Qiu | G06F 12/10 711/6 |
| 2014/0173227 A1* | 6/2014 | Min | G06F 3/0644 711/159 |
| 2017/0364263 A1* | 12/2017 | Lublin | G06F 3/061 |
| 2018/0004680 A1* | 1/2018 | Elzur | G06F 12/145 |

OTHER PUBLICATIONS

Microsoft Exchange 2013 on VMware Best Practices Guide.
International Search Report of PCT/JP2016/050548 dated Feb. 9, 2016.

* cited by examiner

MACHINE SYSTEM, PHYSICAL MACHINE, AND MEMORY CONTROL METHOD

TECHNICAL FIELD

The present invention relates generally to machine control and relates to, for example, technology for memory control.

BACKGROUND ART

There is known a hypervisor that implements a virtual machine by controlling the physical resource of the physical machine. The hypervisor allocates part of the region of the physical memory, which is one of the physical resources, to a virtual machine when generating (starting up) the virtual machine, and releases the region of the physical memory allocated to the virtual machine when erasing (halting) the virtual machine. If the released region of the physical memory is allocated, without being cleared (initialized), to another virtual machine which is to be started up next, information relating to the virtual machine to which the part of the physical memory has been previously allocated may perhaps be stolen by the another virtual machine started up next. In contrast, when using a method of clearing all the part of the physical memory which is to be allocated to the virtual machine before generating the virtual machine, it takes more time for generating the virtual machine.

Patent Document 1 discloses a method in which the memory region of the storage device is not initialized at a timing when the memory region is allocated to the virtual machine, and when access from the virtual machine occurs, the accessed memory region is initialized as necessary. Non-patent Document 1 describes a method called dynamic memory. Further, Non-patent Document 2 describes that the method in Non-patent Document 1 does not work well in optimizing applications.

PRIOR ART DOCUMENT

Patent Document

Patent Document 1: US Patent Application Publication No. 2012/0159071 Specification

Non-Patent Document

Non-patent Document 1: Microsoft Windows Server (registered trademark) 2008R2 Implementing and Configuring Dynamic Memory, Microsoft, October 2010
Non-patent Document 2: Microsoft Exchange 2013 on VMware Best Practices Guide

SUMMARY OF THE INVENTION

Problem to be Solved by the Invention

However, when the method described in Patent Document 1 or Non-patent Document 1 is applied to the physical memory, the following problem arises. That is, the hypervisor is required to trap each access from the virtual machine to the physical memory, resulting in considerably reducing the memory access speed. Thus, the purpose of the present invention is to compatibly achieve allocating the cleared memory region to the virtual machine and making shorter the generation time of the virtual machine.

Means for Solving the Problem

A machine system includes a physical machine, a memory pool, and a memory pool management machine. The physical machine includes a hypervisor that controls a virtual machine. The memory pool management machine manages, with respect to a memory region of the memory pool, an allocated region that is a memory region being already allocated to the virtual machine, a cleared region that is a memory region being not allocated to the virtual machine but already cleared, and an uncleared region that is a memory region being not allocated to the virtual machine and not cleared. When generating the virtual machine, the hypervisor sends the memory allocation request to the memory pool management machine, the memory allocation request including information on a memory capacity which is to be allocated to the virtual machine. When a memory allocation response that has been received from the memory pool management machine and that corresponds to a response to the memory allocation request includes an address range belonging to the uncleared region, the hypervisor clears the memory region of the address range belonging to the uncleared region, and then generates the virtual machine.

The memory pool management machine may be configured such that upon receiving the memory allocation request from the hypervisor, if a memory capacity required for the allocation is larger than a memory capacity of the cleared region, the memory pool management machine allows the memory allocation response to the hypervisor to include an address range belonging to the uncleared region.

The memory pool management machine may be configured to: upon receiving from the hypervisor a memory release request for a memory region that has been allocated to a virtual machine which is to be erased, manage as the uncleared region the memory region required to be released and belonging to the allocated memory region; allow the memory pool to execute clearance processing of the uncleared regions; and manage, within the uncleared regions, regions cleared by the memory pool sequentially as the cleared regions.

Effect of the Invention

According to the present invention, it is possible to compatibly achieve allocating the cleared memory region to the virtual machine and making shorter the time for starting-up the virtual machine.

MODE FOR CARRYING OUT THE INVENTION

Embodiment 1

Figure 1:
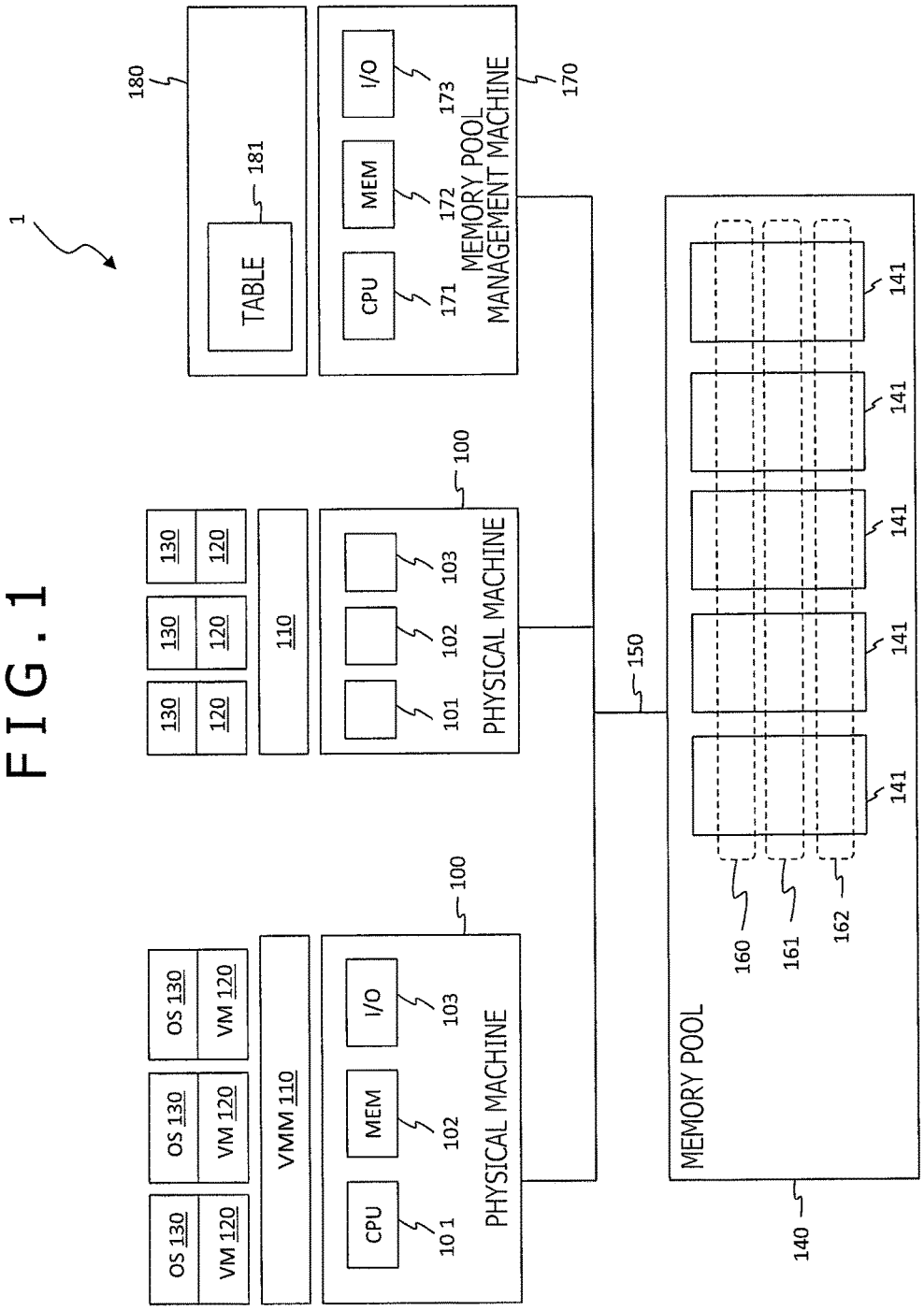
FIG. 1 depicts a configuration example of a machine system.

An embodiment is hereinafter described. In the following description, information is described sometimes by an expression "xxx table," however, the information may be expressed by any data structures. In other words, the "xxx table" can be referred to as "xxx information," showing that the information is not dependent on the data structure.

In addition, in the following description, processing is sometimes described to be executed by a "program." However, since the program is executed by a processor (for example, a central processing unit (CPU)) to perform defined processing with properly using one of a memory source (for example, a memory) and a communication interface device, it can also be said that the processor or a device including the processor executes the processing. Part of or all of the processing executed by the processor may also be executed by a hardware circuit. The computer program may be installed from a program source. The program source may be a program distribution server or a storage medium (for example, a movable storage medium).

Further, in the following description, a collection of a computing machine that manages at least one device included in the machine system is sometimes referred to as "management system." In a case where a management machine displays the display information, the management machine may be the management system. Besides, the combination of the management machine and a displaying machine may also be the management system. Moreover, in order to execute management processing with high speed and with high reliance, a plurality of the computing machines may execute processing equivalent to that executed by the management machine. In that case, the plurality of the computing machines (which can include a displaying machine when the displaying machine executes displaying) may be the management system. In the embodiment, the management machine is the management system. Besides, meaning of "displaying the information by the management machine" may be "displaying the information on a display device provided in the management machine," or "sending the display information to a displaying machine (for example, a client) connected to the management machine (for example, a server)." In the latter case, information indicated by the display information is displayed on a display device of the displaying machine by the displaying machine.

Further, in the following description, a "resource" is an element (device or device part) of the machine system, and may be either a physical element (for example, a processor, a processor core, a memory, a PDEV, a RAID group, or an I/O device such as interface device) or a logical element (such as a VOL, a pool, or a server LPAR). The LPAR is abbreviation of the logical partition. The server LPAR is one section of a server and is a virtual server (virtual machine). The machine system includes a resource group, the resource group includes a plurality of resource units, and the each resource unit includes one or more resources (for example, the same kinds of one or more resources). One resource (for example, the virtual machine) may include a plurality of resources (for example, a virtual processor and a virtual memory).

In the embodiment, described as an example is a case in which processing of generating (starting up) the virtual machine by utilizing part of the memory region of the memory pool on one physical machine capable of accessing one memory pool and processing of erasing (halting) the virtual machine which has been operated on the physical machine with utilizing the part of the memory region of the memory pool are executed in association with another computing machine (memory pool management machine) dedicated for managing memory pool capable of accessing the memory pool. Note that the embodiment is just an example, and it is needless to say that the number of memory pools, the number of physical machines capable of accessing the memory pool, and the number of virtual machines to be generated may be either increased or decreased. Besides, there may be adopted a configuration in which the processing of the memory pool management machine is executed by part of the resources of the physical machine or by the virtual machine, or a configuration in which part of the physical memory in the physical machine is utilized as the memory pool.

FIG. 1 depicts a configuration example of a machine system 1.

Hardware Configuration

The machine system 1 includes one or more physical machines 100, a memory pool management machine 170, and a memory pool 140.

The physical machine 100 and the memory pool management machine 170 may be connected to the memory pool 140 through a memory communication channel 150 in such a manner as to bidirectionally communicate with each other. Infiniband and Ethernet (registered trademark) are examples of the memory communication channel 150.

The memory pool 140 has a memory region configured by one or more memory devices 141, and provides the memory region to the plurality of physical machines or the plurality of virtual machines. The physical machines or the virtual machines may utilize the memory region provided by the memory pool 140 in a manner similar to that with the conventional local memory. The memory pool 140 may be configured by a volatile memory (for example, a dynamic random access memory (DRAM)), by a non-volatile memory (for example, a ferroelectric random access memory (FeRAM) and a magnetoresistive random access memory (MRAM)), or by any combination of the above.

The physical machine 100 may include one or more physical CPUs 101, local memories 102, and I/O devices 103 as the physical resources. The physical machine 100 may access the memory region of the memory pool 140 through the I/O device 103.

The memory pool management machine 170 may include one or more physical CPUs 171, local memories 172, and I/O devices 173. The memory pool management machine 170 may access the memory region of the memory pool 140 through the I/O device 173.

Software Configuration

On the physical machine 100, a virtual machine monitor (VMM) 110 that is a software for server virtualization is developed into the local memory 102 and then operates as a system software. The VMM can also be referred to as hypervisor or visualization mechanism.

The VMM 110 can generate a virtual machine 120 by allocating a part of the physical resources of the physical machine 100. Examples of the physical resources of the physical machine 100 include the physical CPU 101, the local memory 102, the I/O device 103, and the memory pool 140.

A guest OS 130 that is a kind of a program may operate on the virtual machine 120.

A memory pool management section 180 is a kind of a program, and may be developed into the local memory 172 on the memory pool management machine 170 and then executed by the CPU 170. The memory pool management section 180 may alternatively be a logical circuit configured by an application specific integrated circuit (ASIC) or a field programmable gate array (FPGA).

The memory pool management section 180 manages the plurality of memory regions in the memory pool 140 by utilizing a memory pool management table 181.

The memory regions of the memory pool 140 may be segmented into followings: an allocated memory region 160 which is already allocated to the virtual machine 120; a cleared memory region 161 which is not allocated to the virtual machine 120 yet but already cleared; and an uncleared memory region 162 which is not allocated to the virtual machine 120 yet and not cleared yet.

Figure 2:
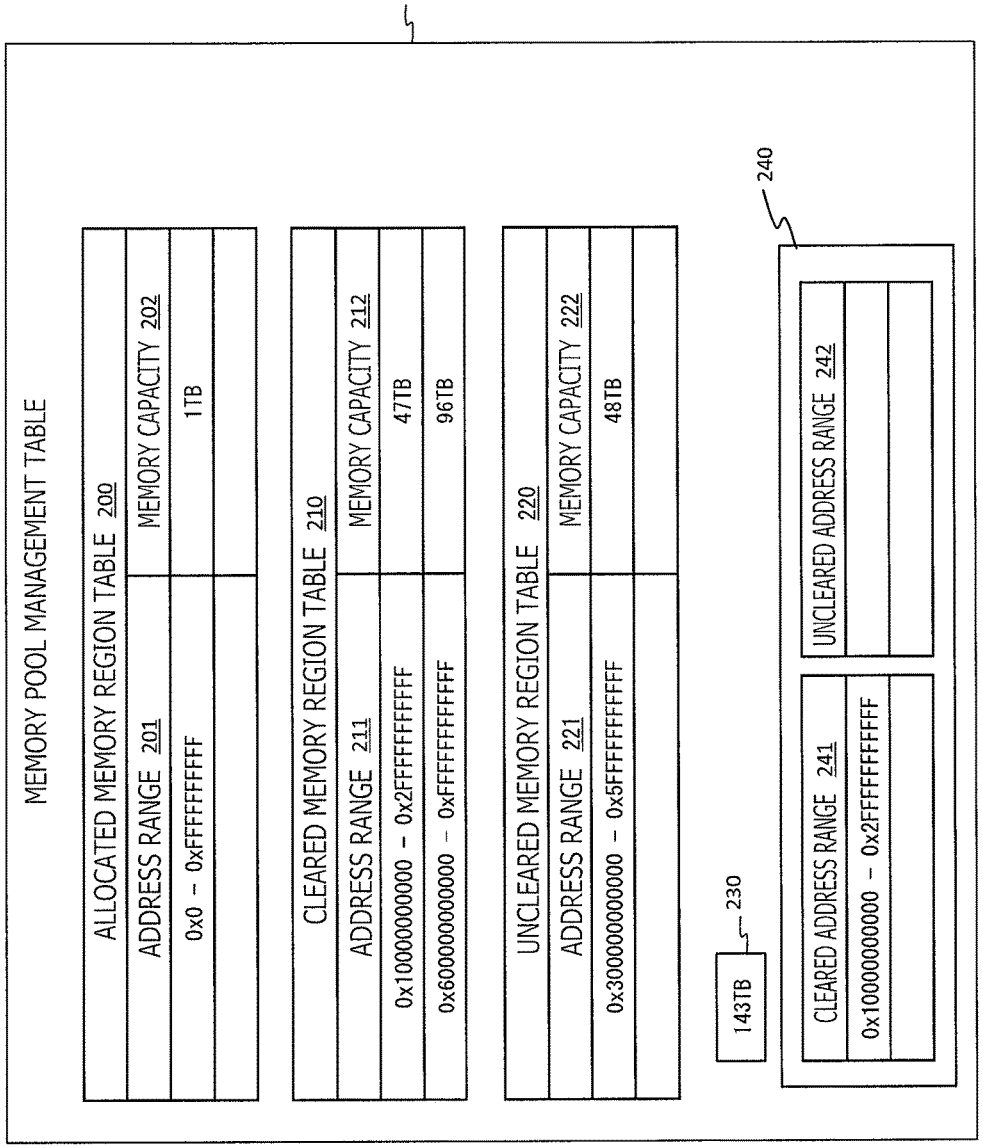
FIG. 2 depicts a configuration example of a memory pool management table.

FIG. 2 depicts a configuration example of a memory pool management table 181.

The memory pool management table 181 is a table for managing the above-mentioned allocated memory region 160, cleared memory region 161, and uncleared memory region 162.

The memory pool management table 180 may include an allocated memory region table 200, a cleared memory region table 210, an uncleared memory table 220, a cleared memory total amount 230, and a response memory region table 240.

The allocated region table 200 manages, from within the memory region in the memory pool 140, an address range 201 of the allocated memory region 160 and a memory capacity 202 of the allocated memory region 160 in a related manner.

The cleared memory region table 210 manages, from within the memory region in the memory pool 140, an address range 211 of the cleared memory region 161 and a memory capacity 212 of the cleared memory region 161 in a related manner.

The uncleared memory region table 220 manages, from within the memory region in the memory pool 140, an address range 221 of the uncleared memory region 162 and a memory capacity 222 of the uncleared memory region 162 in a related manner.

The cleared memory total amount 230 is a sum total of the memory capacities 212 included in the cleared memory region table 210.

The response memory region table 240 includes information utilized when the memory pool management section 180 generates a response to a memory allocation request issued by the VMM 110 upon generating the virtual machine 120. The response memory region table 240 manages a cleared address range 241 and an uncleared address range 242.

Figure 3:
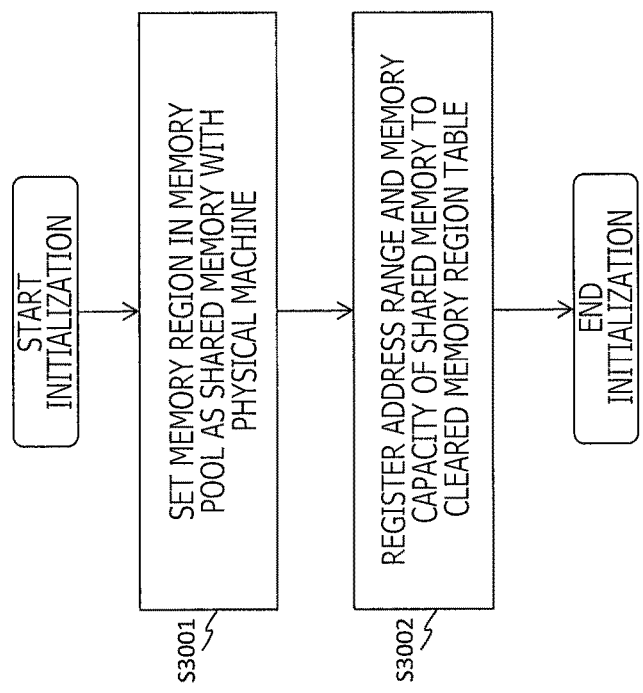
FIG. 3 is a flow chart depicting an example of initialization processing of the memory pool management table.

FIG. 3 is a flow chart depicting an example of initialization processing of the memory pool management table.
(S3001)
The memory pool management section 180 sets the memory region in the memory pool 140 to be sharable by the all physical machines 100. The memory region set sharable is referred to as "shared memory region."
(S3002)
The memory pool management section 180 registers a memory address range and a memory capacity of the shared memory region in the memory pool 140 to the cleared memory region table 210. More specifically, the memory pool management section 180 registers the address range of the shared memory region in the memory pool 140 to the address range 211, and registers the memory capacity of the shared memory region in the memory pool 140 to the memory capacity 212.

The memory pool management table 181 is initialized by the above processing.

Figure 4:
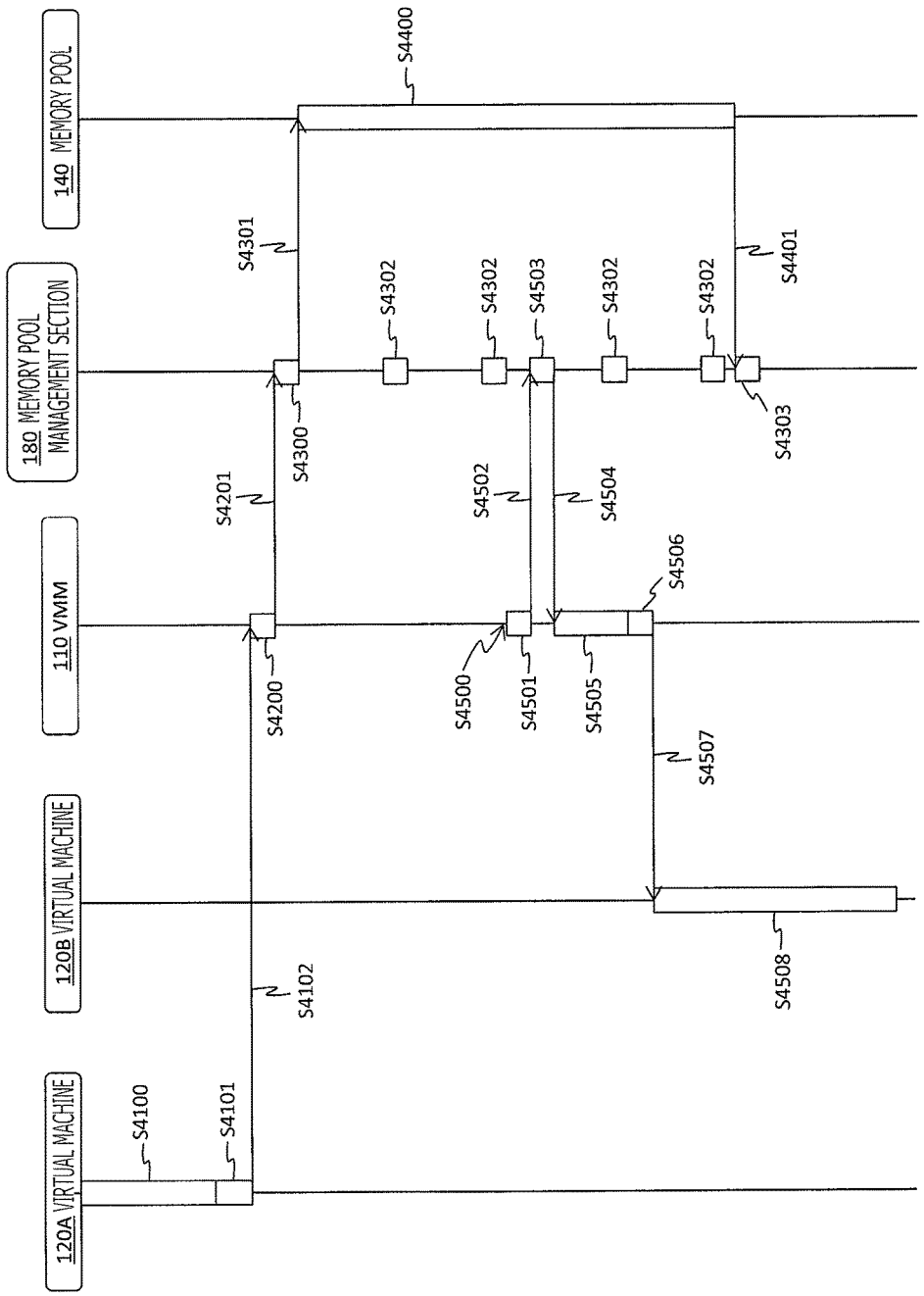
FIG. 4 is a sequence chart depicting an example of start-up (generation) processing and halt (erasure) processing by a virtual machine monitor (VMM), and the associated processing of a memory pool management section.

FIG. 4 is a sequence chart depicting an example of generation processing and erasure processing of the virtual machine 120 by the VMM 110, and the associated processing of the memory pool management section 180.

First, the erasure (halt) processing of the virtual machine 120 is described.
(S4100)
A guest OS 130 is operating on the virtual machine 120A.
(S4101)
At this time, if a shut-down command is issued, for example, the virtual machine 120A executes shut-down processing of the guest OS 130.
(S4102)
After the shut-down processing in S4101 has completed, an erasure notification of the virtual machine 120A is issued to the VMM 110. Specifically, the erasure notification of the virtual machine 120A may be a notification indicating that the power of the virtual machine 120A has been turned off.
(S4200)
Upon receiving this erasure notification, the VMM 110 executes the erasure processing of the virtual machine 120A. In the erasure processing, the allocated physical resources (for example, physical CPU 121, local memory 122, I/O device 123, and memory regions of memory pool 140) maybe released. At this time, the memory region allocated from the memory pool 140 to the virtual machine 120A is also released. Note that the VMM 110 may execute the erasure processing of the virtual machine 120A by receiving another notification other than the erasure notification or other factor as a trigger.
(S4201)
The VMM 110 notifies the memory management section 180 of the memory region which has been allocated to the virtual machine 120A (that is, released at S4200). For example, the VMM 110 notifies the memory management section 180 of the address range of the memory region released in memory pool 140. This is intended to enable the memory management section 180 to clear the memory region released in the step S4200.
(S4300)
Upon receiving the notification in step S4201, the memory pool management section 180 identifies the memory region included in the notification. For example, the memory pool management section 180 searches an address range included in the notification from the allocated region table 200, and then moves the address range 201 and the memory capacity 202, which are matched with the search, to the address range 221 and the memory capacity 222 in the uncleared memory region table 220.
(S4301)
The memory pool management section 180 issues a clearing (initializing) command for the uncleared memory region 162 to the memory pool 140. This is intended to clear the memory region of the address range identified in S4300. The clearance processing is, for example, processing of writing "zero" to the memory region of the address range, or processing of flushing the memory page corresponding to the memory region.
(S4400)
The memory pool 140 starts the clearance processing for the uncleared memory region 162 in accordance with the clearing command for the uncleared memory region 162 in S4301. When the virtual machine 120A is erased, the clearance processing for the memory region of the memory pool 140A allocated to the virtual machine 120A may be immediately started. The memory region for which the clearance processing has completed sequentially becomes the cleared memory region.

(S4401)

After S4400 has completed, the memory pool 140 notifies the memory pool management section 180 that the clearing of the uncleared memory region 162 has completed.

(S4302)

During performing S4400, the memory pool management section 180 periodically confirms the clearing state of the cleared memory region. For example, the memory pool management section 180 computes the address range and the memory capacity of the cleared memory region 161 on the basis of the progress of the clearance processing of the uncleared memory region in S4301. Then, the memory pool management section 180 adds/updates the address range 211 and the memory capacity 212 in the cleared memory region table 210, updates the cleared memory total amount 230 computed on the basis of the memory capacity 212, and updates the address range 221 and the memory capacity 222 in the uncleared memory region table 220. In other words, the memory pool management section 180 reflects the progress of the clearance processing in S4400 to the memory pool management table 181. Typically, the memory pool management section 180 sequentially moves to the cleared memory region table 210 the address ranges for which the clearance processing has completed among the address ranges 221 registered in the uncleared memory region table 220.

(S4303)

After S4401 has completed, the memory pool management section 180 executes the final update processing of the clearing state of the cleared memory region 161.

Next, the generation (start-up) processing of a virtual machine 120B is described.

(S4500)

VMM 111 receives a generation request of the virtual machine 120B.

(S4501)

The VMM 111 identifies a memory capacity to be allocated (referred to as "allocation request memory capacity") from the memory pool 140 for the virtual machine 120B which has been generation-required in S4500.

(S4502)

The VMM 111 sends a memory allocation request to the memory pool management section 180. The memory allocation request may include the allocation request memory capacity identified in S4501.

(S4503)

Upon receiving the memory allocation request of S4502, the memory pool management section 180 executes, for example, the following processing. That is, the memory pool management section 180 deletes all values held in the response memory region table 240. Then, the memory pool management section 180 compares the allocation request memory capacity included in the memory allocation request of S4502 with the cleared memory total amount 230.

In a case where the allocation request memory capacity is equal to or smaller than the cleared memory total amount 230, the memory pool management section 180 executes the following processing. That is, the memory pool management section 180 computes an address range corresponding to the allocation request memory capacity, within the cleared memory region table 210. Then, the memory pool management section 180 moves the computed address range 211 to the cleared address range 241 in the response memory region table 240. After that, the memory pool management section 180 registers also to the allocated memory region table 200 the address range corresponding to that has been moved to the cleared address range 241 in the response memory region table 240. Then, the memory pool management section 180 updates the cleared memory total amount 230.

On the other hand, in a case where the allocation request memory capacity is larger than the cleared memory total amount 230, the memory pool management section 180 executes following processing. That is, the memory pool management section 180 moves all the address ranges 211 registered in the cleared memory region table 210 to the allocated memory region table 200. In addition, the memory pool management section 180 computes the address range 221 corresponding to a shortage to fill the allocation request memory capacity, within the uncleared memory region table 210. This memory capacity of the address range 221 corresponding to the shortage may be equal to or larger than the difference between the allocation request memory capacity included in the memory allocation request and the cleared memory total amount 230. Then, the memory pool management section 180 moves the computed address range 221 to the uncleared address range 242 in the response memory region table 240. After that, the memory pool management section 180 registers also to the allocated memory region table 200 the address range corresponding to that has been moved to the cleared address range 241 and uncleared address range 242 in the response memory region table 240.

(S4504)

The memory pool management section 180 returns free memory information to the VMM 110. The free memory information may be, for example, information registered in the response memory region table 240.

(S4505)

Upon receiving the free memory information of S4504, the VMM 110 executes clearance processing for only the uncleared address range 242 included in the free memory information. This clearance processing may be similar to that in S4301, S4400, and S4401. When the clearance processing is completed, the correspondence to the allocation request memory capacity is completely cleared in the memory pool 140. Note that when the free memory information does not include the uncleared address range 242, the VMM 110 may not execute the clearance processing depending on S4504.

(S4506)

The VMM 110 executes generation processing of the virtual machine 120B. For example, the VMM 110 allocates to the virtual machine 120B a part (for example, a physical CPU 101, a local memory 122, or an I/O device 123) of the physical resources on the physical machine 100, the cleared address range 241 included in the free memory information of S4504, and the uncleared address range 242 which has been subjected to the clearance processing in S4505.

(S4507)

The VMM 110 issues a generation command of the virtual machine 120B to which the physical resource has been allocated in S4506. Due to this, the virtual machine 120B is generated, which in turn starts the operation of the guest OS 130B. The generation command may be a command for turning on the power of the virtual machine 120B.

The machine system according to the present embodiment executes clearance processing of the allocated memory region 160 promptly after erasure of the virtual machine 120. Due to this, the cleared memory region 161 in the memory pool 140 sequentially increases. Thus, at the time of generating the virtual machine 120, a relatively large amount of the cleared memory region 171 can exist in the memory pool 140. Further, even in a case where the cleared memory region 161 is short, it suffices to execute the clearance processing with the uncleared memory region 162 by an amount only corresponding to the shortage. As a result, the clearance processing can be completed in a relatively short time. In other words, the machine system 1 according to the present embodiment can compatibly achieve allocating the cleared memory region to the virtual machine 120 and making shorter the generation time of the virtual machine 120. Moreover, because the memory region is allocated in a manner of static memory allocation, there is also benefit that the performance is optimized in the application layer.

The above embodiment is only illustrative for the description of the present invention, and the scope of the present invention is not limited to the embodiment. The person skilled in the art can perform the present invention in other various modes without deviating from the gist of the present invention.

DESCRIPTION OF REFERENCE CHARACTERS

1: Machine system
100: Physical machine
110: VMM
120: VM
140: Memory pool
170: Memory pool management machine
180: Memory pool management table

The invention claimed is:

1. A machine system comprising a physical machine, a memory pool, and a memory pool management machine, wherein
the physical machine includes a hypervisor that controls a virtual machine,
the memory pool management machine manages, with respect to a memory region of the memory pool, an allocated region that is a memory region being already allocated to the virtual machine, a cleared region that is a memory region being not allocated to the virtual machine but already cleared, and an uncleared region that is a memory region being not allocated to the virtual machine and not cleared,
the hypervisor is configured to:
when generating the virtual machine, send the memory allocation request to the memory pool management machine, the memory allocation request including information on a memory capacity which is to be allocated to the virtual machine; and
when a memory allocation response that has been received from the memory pool management machine and that corresponds to a response to the memory allocation request includes an address range belonging to the uncleared region, clear the memory region of the address range belonging to the uncleared region, thereafter generating the virtual machine.

2. The machine system according to claim 1, wherein
the memory pool management machine is configured to
upon receiving the memory allocation request from the hypervisor, if a memory capacity required for the allocation is larger than a memory capacity of the cleared region, allow the memory allocation response to the hypervisor to include an address range belonging to the uncleared region.

3. The machine system according to claim 2, wherein
the memory capacity of the address range belonging to the uncleared region included in the memory allocation response is equivalent to a difference between the memory capacity included in the memory allocation request and the capacity of the cleared region.

4. The machine system according to claim 1, wherein
the memory pool management machine is configured to:
upon receiving from the hypervisor a memory release request for a memory region that has been allocated to a virtual machine which is to be erased, manage as the uncleared region the memory region required to be released and belonging to the allocated memory region;
allow the memory pool to execute clearance processing of the uncleared regions; and
manage, within the uncleared regions, regions cleared by the memory pool sequentially as the cleared regions.

5. A physical machine including a hypervisor for controlling a virtual machine, wherein
the hypervisor can communicate with a memory pool management machine that manages, with respect to a memory region of the memory pool, an allocated region that is a memory region being already allocated to the virtual machine, a cleared region that is a memory region being not allocated to the virtual machine but already cleared, and an uncleared region that is a memory region being not allocated to the virtual machine and not cleared, and
the hypervisor is configured to:
when generating the virtual machine, send the memory allocation request to the memory pool management machine, the memory allocation request including information on a memory capacity which is to be allocated to the virtual machine; and
when a memory allocation response that has been received from the memory pool management machine and that corresponds to a response to the memory allocation request includes an address range belonging to the uncleared region, clear the memory region of the address range belonging to the uncleared region, thereafter generating the virtual machine.

6. A memory control method in a machine system including a physical machine, a memory pool, a memory pool management machine, wherein
the physical machine includes a hypervisor for controlling a virtual machine,
the memory pool management machine manages, with respect to a memory region of the memory pool, an allocated region that is a memory region being already allocated to the virtual machine, a cleared region that is a memory region being not allocated to the virtual machine but already cleared, and an uncleared region that is a memory region being not allocated to the virtual machine and not cleared,
when generating the virtual machine, the hypervisor sends the memory allocation request to the memory pool management machine, the memory allocation request including information on a memory capacity which is to be allocated to the virtual machine,
upon receiving the memory allocation request from the hypervisor, if a memory capacity required for the allocation is larger than a memory capacity of the cleared region, the memory pool management machine sends to the hypervisor a memory allocation response including an address range belonging to the uncleared region, and
when a memory allocation response that has been received from the memory pool management machine includes an address range belonging to the uncleared region, the hypervisor clears the memory region of the address range belonging to the uncleared region and thereafter generates the virtual machine.

7. The memory control method according to claim 6, wherein when erasing a virtual machine, the hypervisor sends to the memory pool management machine a memory release request of a memory region allocated to the virtual machine which is to be erased, and the memory pool management machine is configured to:
  upon receiving the memory release request from the hypervisor, manage as the uncleared region the memory region required to be released and belonging to the allocated memory region;
  allow the memory pool to execute clearance processing of the uncleared regions; and
  manage, within the uncleared regions, regions cleared by the memory pool sequentially as the cleared regions.

* * * * *